United States Patent [19]
Perkins et al.

[11] Patent Number: 5,636,713
[45] Date of Patent: Jun. 10, 1997

[54] MULTIPLE RAM ASSEMBLY AND RECUPERATIVE DRIVE SYSTEM FOR HYDRAULIC LIFT

[76] Inventors: Rex H. Perkins, 42 Overlook Road, Donvale, Victoria, Australia, 3111; Frederick H. Van Essen, 3/84 Fordham Avenue, Camberwell, Victoria, Australia, 3124

[21] Appl. No.: 392,785

[22] PCT Filed: Aug. 31, 1993

[86] PCT No.: PCT/AU93/00447

§ 371 Date: Feb. 28, 1995

§ 102(e) Date: Feb. 28, 1995

[87] PCT Pub. No.: WO94/05583

PCT Pub. Date: Mar. 17, 1994

[30] Foreign Application Priority Data

Aug. 31, 1992 [AU] Australia ................. PL4385

[51] Int. Cl.⁶ .................................................. B66B 9/04
[52] U.S. Cl. ...................... 187/274; 187/226; 187/275; 91/170 R; 91/508
[58] Field of Search ................. 187/72, 74, 75, 187/226; 191/170 R, 508

[56] References Cited

U.S. PATENT DOCUMENTS

| 3,035,663 | 5/1962 | Mehlmann | 187/226 |
| 3,830,342 | 8/1974 | Allen | 187/226 X |
| 4,095,677 | 6/1978 | Johannson . | |
| 4,215,545 | 8/1980 | Morello . | |
| 4,363,380 | 12/1982 | Rued et al. | 187/274 |
| 4,731,997 | 3/1988 | Hagin . | |
| 4,745,745 | 5/1988 | Hagin . | |

FOREIGN PATENT DOCUMENTS

| 2106792 | 10/1972 | Germany . |
| 2655135 | 2/1978 | Germany . |
| 3834918 | 7/1989 | Germany . |
| 418560 | 2/1967 | Switzerland . |
| 2255804 | 11/1992 | United Kingdom . |
| 87/05081 | 8/1987 | WIPO . |
| 88/03123 | 5/1988 | WIPO . |

OTHER PUBLICATIONS

Patent Abstracts of Japan, M–1366, p. 159, JP,A, 4–277180 (Hitachi Ltd) 2 Oct. 1992.
Patent Abstracts of Japan, M–78, p. 4920, JP,A, 53–115478 (Shin Nippon Seitetsu K.K.) 10 Jul. 1978.

*Primary Examiner*—William E. Terrell
*Assistant Examiner*—Khoi H. Tran
*Attorney, Agent, or Firm*—Weiser & Associates, P.C.

[57] ABSTRACT

A multi-stage hydraulic ram assembly for the accumulator drive system of an elevator assembly includes a plurality of piston-cylinder arrangements connected hydraulically in parallel and mechanically in series. The piston-cylinder arrangements are disposed in substantial side-by-side relationship, constituting adjacent or successive stages of the ram assembly. A bracket is fixed to one of the cylinders and is slidably connected to the adjacent cylinder, for interconnecting adjacent cylinders of the piston-cylinder arrangements, and a drive system is provided for operating the ram assembly. Steps are taken to control the direction and speed of movement of adjacent stages of the assembly, and to ensure that all of the stages of the assembly move at substantially the same speed.

13 Claims, 8 Drawing Sheets

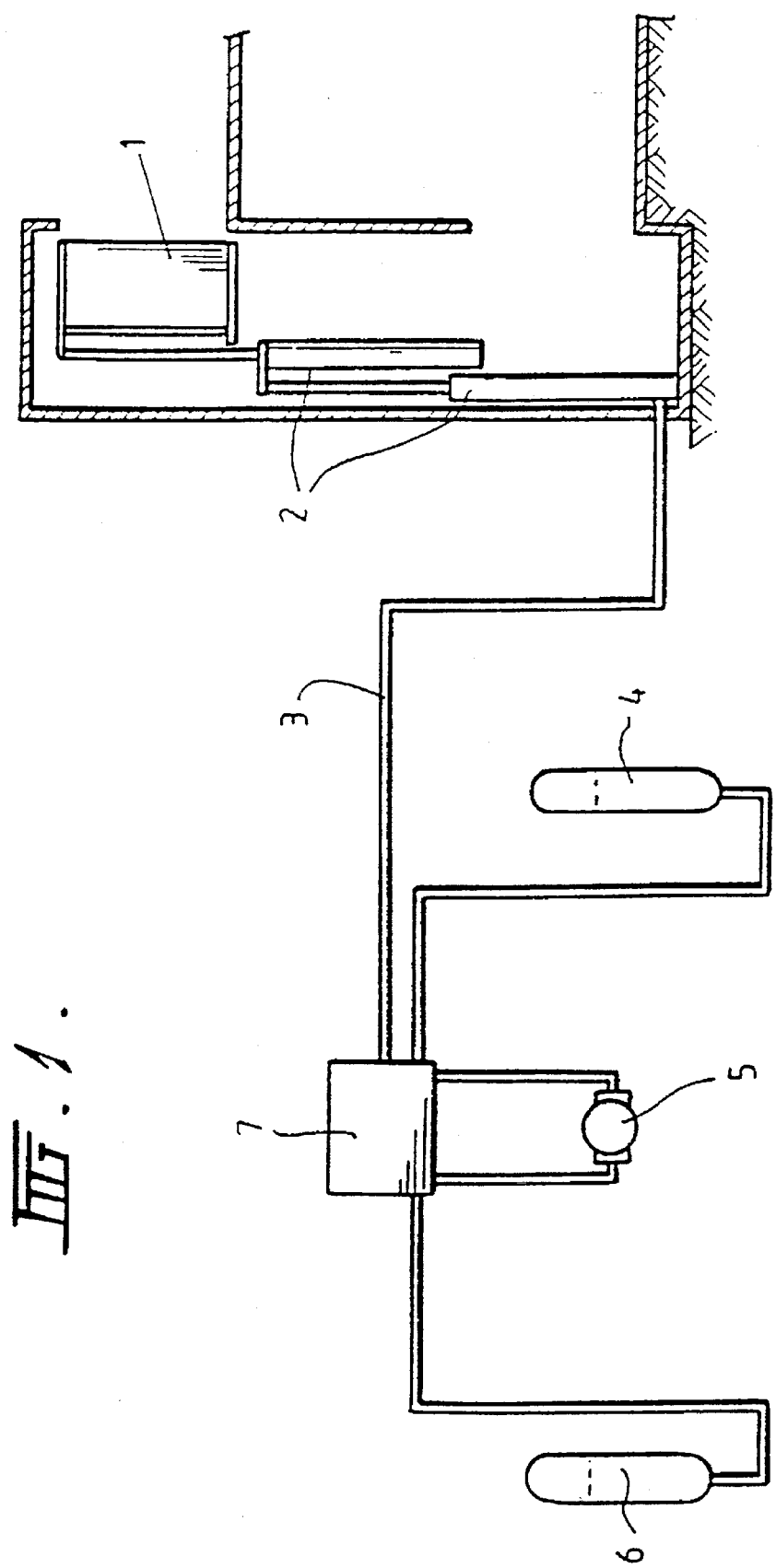

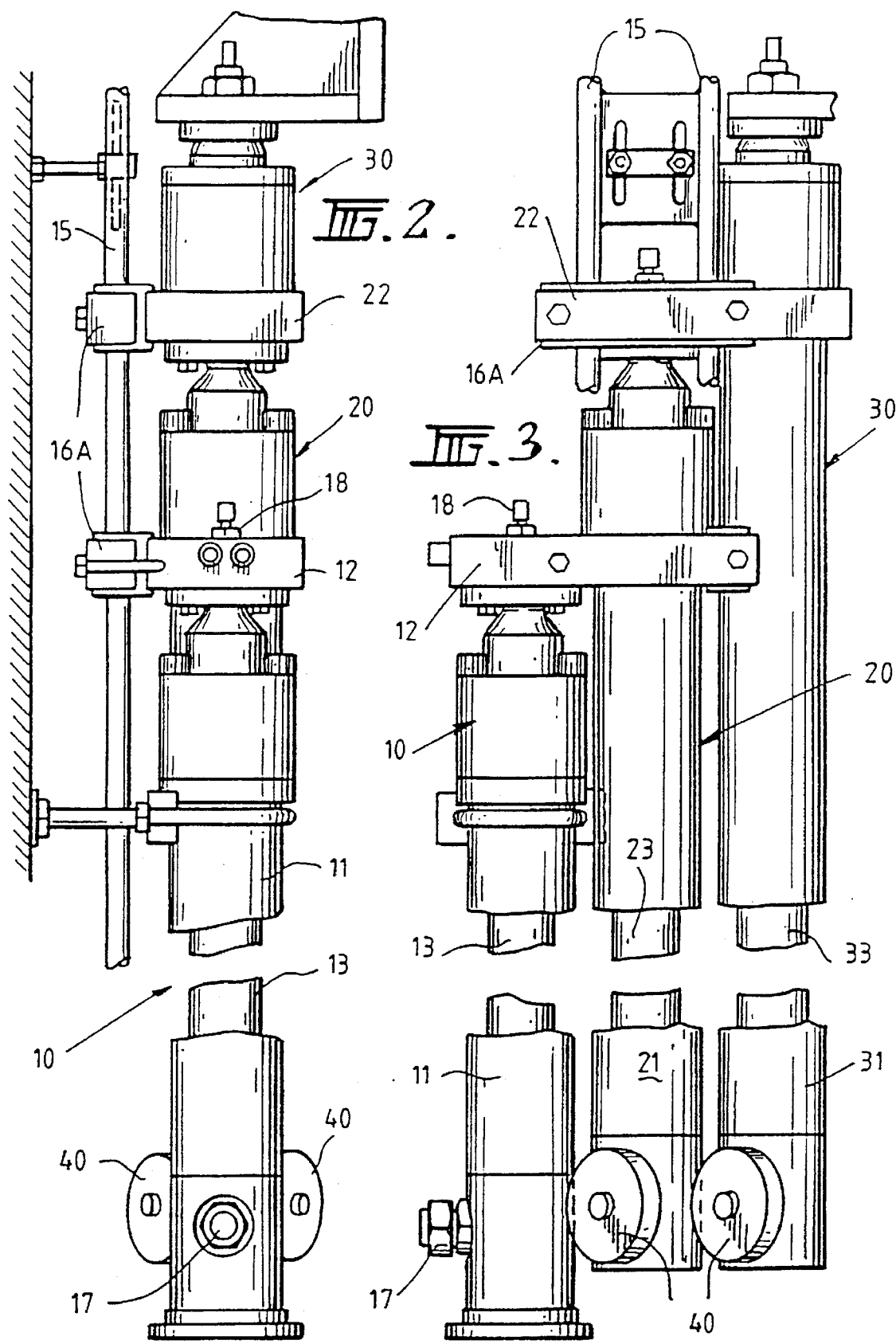

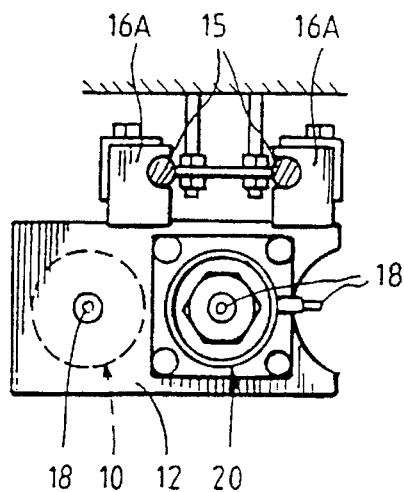
FIG. 5A.
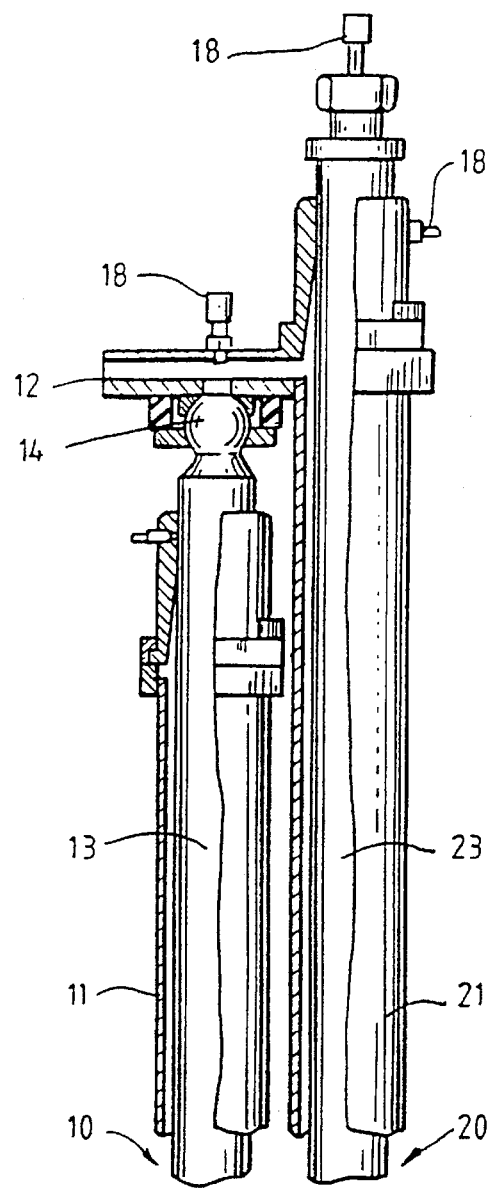
FIG. 5.
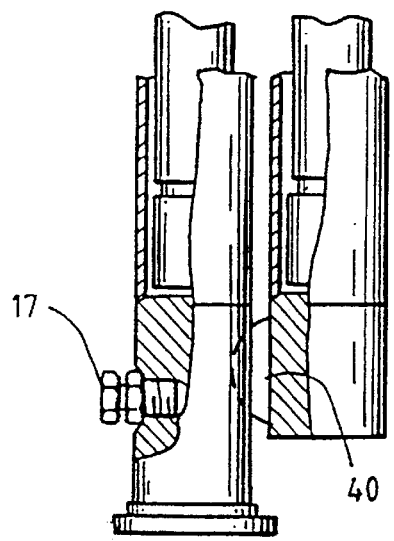

MULTIPLE RAM ASSEMBLY AND RECUPERATIVE DRIVE SYSTEM FOR HYDRAULIC LIFT

BACKGROUND OF THE INVENTION

This invention relates, in general terms, to an improved form of lift or elevator system, and to parts of and components therefor. More particularly, but not exclusively, the invention relates to a lift or elevator system, and an overall drive means therefor, which is responsible for a substantial saving in power input and energy use, and accordingly cost, when compared with the known art. The invention also relates to a multi-stage hydraulic cylinder system which is especially suited for use in lift or elevator systems of the aforementioned type, but is adaptable for use in other contexts.

Throughout the ensuing description, for ease of explanation reference will be made to a so-called hydraulic lift. It must be realised, however, that the present invention is not to be considered to be restricted solely to such types of lifts and in fact in certain aspects of the present invention need not even be restricted to the field of lifts. More especially, the present invention will be equally suitable for use with:

(1) traction elevators;
(2) hydraulic elevators wherein motion is achieved through the operation of a ram or cylinder; and
(3) any drive system that uses hydraulic fluid under pressure.

Hydraulic lifts as currently in use employ a pump and a drive means or motor to deliver oil under pressure to a cylinder and associated piston, thereby giving rise to linear motion as a result of extension of the cylinder. Such linear motion, initially in a vertical direction, allows for movement of a lift car or carriage between prearranged storeys or levels of any given structure. Of course once the lift car or carriage is moved upwardly, it ultimately becomes necessary to allow for movement downwardly. In accordance with the known art the majority of lifts are made to move in a downwards direction by the utilization of appropriate valving for venting of the oil or other hydraulic fluid, which is under pressure, back to a storage tank for such fluid, which is generally speaking at atmospheric pressure. In practical terms it should therefore be realised that power or energy is necessary in order to actuate or operate such a hydraulic system whereby to allow for upward movement of the lift or carriage. Such hydraulic fluid under pressure is a source of potential energy, in practical terms representing a reservoir of stored energy. Unfortunately, however, in accordance with known apparatus practices and techniques, such stored energy is, to all intents and purposes, totally dissipated and lost as a result of venting of the oil to atmosphere on what might be termed the down stroke. Put simplistically, therefore, hydraulic lift systems of this known type require energy input to produce vertical upward movement but then rely in effect on gravity to produce subsequent downward movement. In terms of moving a dead weight between vertical storeys of a building or the like structure, the energy or power input necessary therefore can be quite substantial. Furthermore, large electric motors are invariably needed, since the car is not counterweighted, and this requires substantial electrical wiring. As such, because of the power input needed, the plant required in accordance with the known art has been bulky, space-consuming and expensive.

Again in accordance with the known art, lift or elevator systems currently in use for the transport of passengers or plant between spaced-apart levels utilise or employ three basic methods or means of achieving the desired motion and control thereof. These three methods are:

(1) electrical traction drives;
(2) a combination of electrical means and screw drives; and
(3) hydraulic cylinder-ram drives.

The hydraulic ram configuration generally includes a single or multiple-element piston in an appropriate housing, with the piston itself moving in direct proportion to input flow and having a stroke length somewhat less than the retracted length. In accordance with known techniques such a hydraulic ram can be mounted either underneath the lift car or carriage, or alternatively along-side that car or carriage, dependent upon the amount of space available. One disadvantage associated with a configuration wherein the ram is mounted underneath he car or carriage resides in the need for the provision of a caisson, with no such caisson actually being required in an arrangement utilising a ram mounted along-side the car or carriage.

When the required length of travel for the lift or elevator is longer than the maximum available retracted length of the ram, as is quite often the case, then in accordance with the known techniques it has become necessary to rely on a compound and complicated design or configuration termed "a phasing telescopic cylinder" and involving a sleeving assembly. Such a configuration utilises telescopic or telescoping rods, one inside the other, of a suitable number whereby to bring about the desired length of travel for the overall lift car or carriage. In a practical sense, however, in order to achieve constant car speed, avoiding jerky motion, each rod or tube must be what is termed "phased". In other words, each sleeve must be adapted to move at the same time. In hydraulic terms such can be achieved by feeding the annulus fluid from each rod section to the full cross-sectional area of the next inner cylinder. The diameter is calculated in order to achieve constant relative speeds between adjacent tubes. Other methods, such as for example phasing by connecting each stage through a series of chains or slings, could also be used. Again in practical terms, in order to bring about constant speed and smooth travel of lift or car, all tubes must reach the end of their stroke together.

With such arrangements rephasing checks are required in each tube section. In practical terms such configurations have been found to work relatively satisfactorily. By the same token, however, such prior art arrangements have been determined to suffer from several important advantages. First of all, the rather complicated telescoping cylinder arrangement is difficult and accordingly expensive to manufacture. Secondly, such a configuration requires in effect two distinct sealing areas for each telescoping or telescopic section. Thirdly, such a configuration has been found to be inordinately bulky. Fourthly, such a configuration has been found to require special machinery to manufacture. All these factors give rise to their own problems, and the end result is an overall arrangement which, apart from being rather complicated in operation, is expensive in manufacture, installation and maintenance. Such expensive configurations have resulted in a limitation on the exploitation of such an arrangement.

OBJECT OF THE INVENTION

It is therefore an object of the invention to provide an improved drive system, hydraulically operated, for use in an elevator or the like. This is achieved, in general terms, by the use of pressure accumulators whereby energy can be recovered for subsequent re-use and input energy is no longer required in peak form, but is averaged out, thus requiring or needing component sizes and current levels which are nominally as little as 25% of those used in more conventional apparatus. In the result, elevator speed and carrying capacity is no longer a function of power input, but rather of the duty cycle.

It is a further object of the present invention to provide a multi-barrel cylinder, for use in operating a lift or elevator of any given type, which uses a series of substantially identical barrels or piston-cylinder arrangements, assembled side-by-side, thereby to produce a multi-stage hydraulic cylinder. Such a cylinder is compact, energy efficient and has a large range of lifting capacities and strokes available.

The present invention seeks to overcome the problems and disadvantages associated with the prior art by providing an improved form of lift or elevator system which is simple in construction, when compared with the known art, easier to both install and maintain, again when compared with the known art, and accordingly much less expensive than the prior art configurations. The arrangements in accordance with the present invention thus lend themselves to utilisation in a variety of different contexts, contexts which have not previously been pursued, primarily because of the cost factor.

DESCRIPTION OF DRAWINGS

In order that the invention may be more clearly understood and put into practical effect there shall now be described in detail preferred embodiments of a lift or elevator system, and a drive means therefor. The ensuing description is given by way of non-limitative example only and is with reference to the accompanying drawings, wherein:

FIG. 1 is a schematic view of an improved elevator system in accordance with the present invention;

FIG. 2 is a general assembly view, in side elevation, of a constant speed multiple ram assembly in accordance with the present invention, to be used for purposes of moving a lift car or carriage between vertically spaced-apart levels or storeys of any given structure;

FIG. 3 is a front elevational view of the arrangement of FIG. 2;

FIG. 5 is an exploded view of the two-stage hydraulic cylinder arrangement of FIG. 4;

FIG. 5A is a top plan view of the two-stage hydraulic cylinder arrangement of FIG. 5;

FIG. 6A is a top plan view of the three-stage hydraulic cylinder arrangement of FIG. 6;

FIG. 10 is a perspective view of a general arrangement of an accumulator drive system in accordance with the invention, to be installed on or in relation to a lift car or carriage or the like.

DESCRIPTION OF PREFERRED EMBODIMENTS

Figure 4:
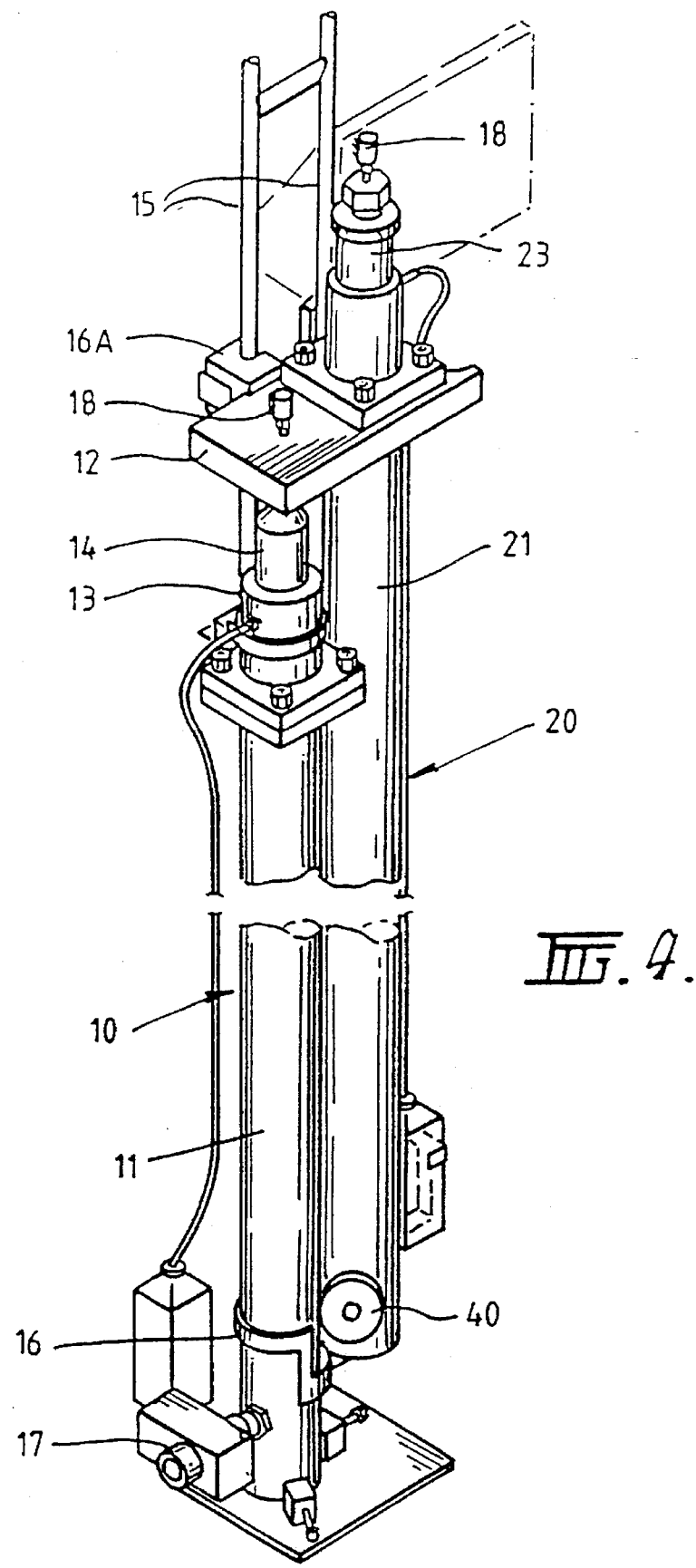
FIG. 4 is a perspective view of a two-stage hydraulic cylinder arrangement in accordance with the present invention.

With reference firstly to FIG. 1 of the drawings, one embodiment of a lift or elevator system in accordance with the present invention is illustrated therein schematically. The main components of the system are as follows.

An elevator car 1 of any given type is arranged for movement as desired between levels of a multi-storey structure. To give rise to such controlled movement a multi-stage hydraulic cylinder system 2 in accordance with the invention is employed, such system allowing for not only improved control over the direction and speed of movement, but also in practice allows for greater speeds of movement to be achieved, this when compared with the known art. The hydraulic cylinders of the system 2 are thus in flow connection, via suitable oil lines 3 of any given type, and with the interposition of a valve or controller 7, to respective high pressure and low pressure accumulators 6 and 4 and a pump motor 5 (again of any given type). In accordance with the present applicant's arrangement, the use of high and low pressure accumulators 6 and 4 gives rise to a substantial saving in power input for operating the lift system—again when compared with the known art. This in turn means that the overall size (dimensions) of the operating system of a lift configuration in accordance with the present invention is markedly reduced when compared with the prior art conventional arrangements—an important practical advantage.

Figure 6:
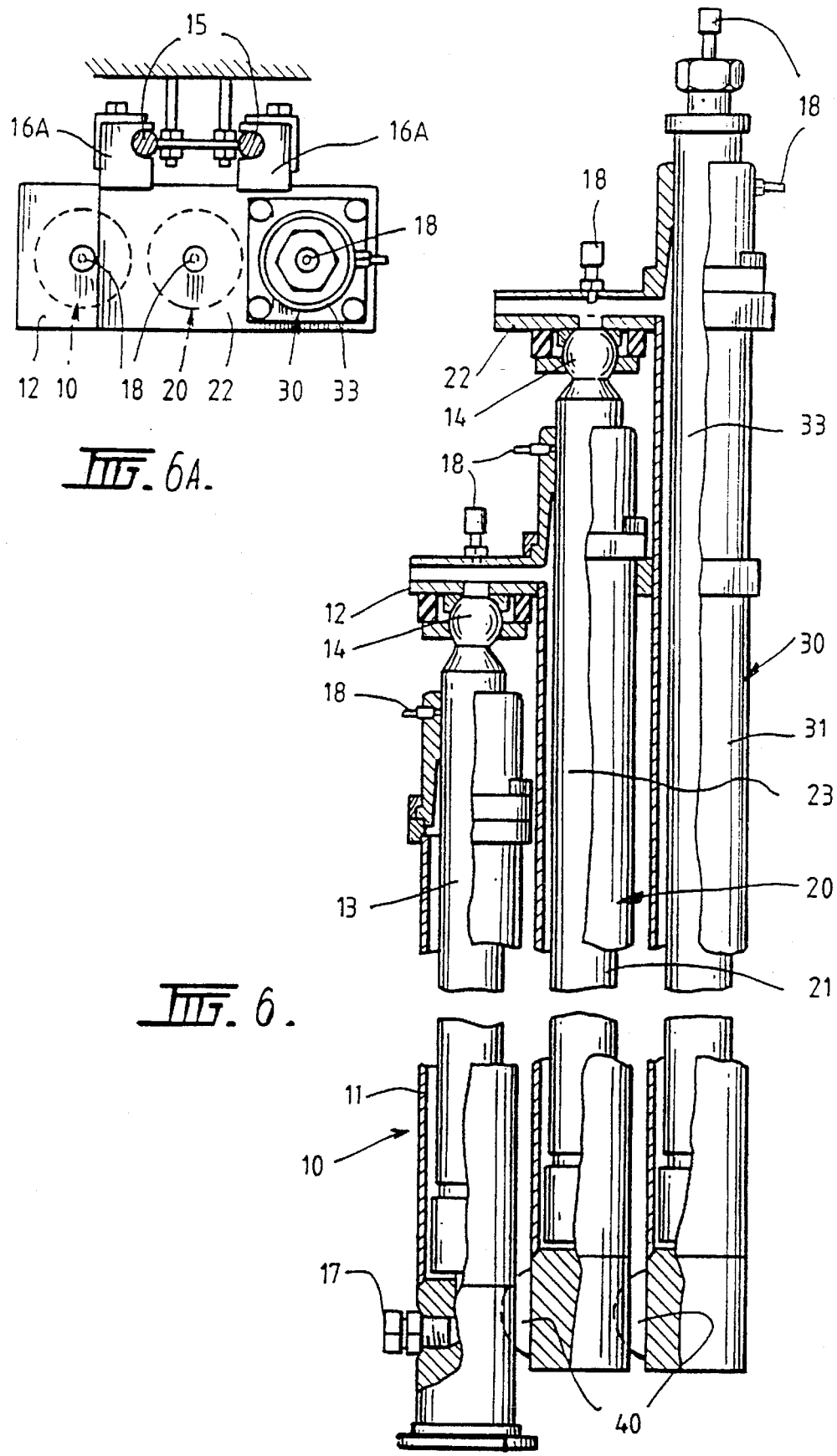
FIG. 6 is a view similar to FIG. 5, but of a three-stage hydraulic cylinder arrangement.

With reference now to FIGS. 2 to 6 of the drawings, there are illustrated therein embodiments of a multiple ram or cylinder assembly in accordance with the invention. The embodiment as illustrated in FIGS. 2, 3 and 6 includes three ram assemblies, generally designated 10, 20 and 30 respectively, all being connected hydraulically in parallel, whilst the embodiment of FIGS. 4 and 5 includes merely two such assemblies, 10 and 20. This in itself is in marked contrast to the prior art arrangements, which generally speaking employ a plurality of rams connected hydraulically in series. In that regard it should be realised that, with an arrangement wherein the various ram assemblies are positioned co-axially or in series, then in a practical sense the overall diameter of the ram assembly must vary from ram to ram, accordingly giving rise to commensurate changes in piston area. Such known prior art arrangements, as stated earlier, are complicated, inordinately large, bulky and heavy and expensive and also have other engineering limitations in terms of construction, installation, maintenance and overall operation.

With the arrangement of the present invention, as illustrated in FIGS. 2 to 6, the outer rod 11 of a cylinder of a first stage 10 is connected, via a support member and associated transfer plate 12, to a gland of a second stage 20, the outer rod 21 of that second stage 20 in turn being connected, via a second support member 22, to a gland of a third stage 30. Preferably the inner rods 13, 23 and 33 of each stage, all of the same cross-sectional area, are chromed. In a practical sense the number of stages arranged in parallel is virtually unlimited, and in that regard it should be realised that, whilst in the preferred embodiment illustrated there includes only three and two respectively such parallel-arranged rams or stages, the invention should not be in any way considered to be limited to just such an arrangement. With the present applicant's arrangement the various stages or ram assemblies 10, 20 and 30 are connected hydraulically in parallel, but mechanically in series. Each stage includes an inner rod 13, 23 and 33 having the same surface area. The arrangement will provide constant car or carriage speed by coupling the extensions mechanically using either a cable or a chain system, such an arrangement resulting in all extensions moving together at the same time. In the especially preferred embodiments illustrated a flexible coupling means 14 of any given type may be employed and located at the topmost portion of all except the final stage or extension.

With reference once again to FIGS. 2 to 5 of the drawings, since the relevant forces no longer act co-axially, then a bearing guide or wheel, designated 40, will be employed between the housings of adjacent ram assemblies 10, 20 and 30, such wheel or bearing 40 being intended to negate forces generated by the subsequent moment force of the various support members 12, 22 interconnecting the adjacent ram assemblies 10, 20, 30.

In an especially preferred embodiment of the present invention there is provided one or more guide rails, generally designated 15, which in a practical sense is or are adapted to be mounted either on the wall of the elevator shaft or within the frame of the elevator. Such guide rail 15 represents the most effective and economical means of ensuring controlled travel of the overall lift incorporating such a multiple ram assembly, and serves to steady the top of each stage as it is being extended. In the especially preferred embodiment of FIG. 4 the or each guide rail 15 will have associated therewith a guide block 16A, which may be fixed in any known manner to the transfer plate(s) 12, 22 and adapted to run along the guide rail 15. Again with reference to FIG. 4 each stage will include toward the base thereof, a ram holding bracket 16 intended, in use, to stop the base of each stage from moving away from the preceding stages. At or in the vicinity of the base of each stage is an inlet/outlet port or means 17 allowing for in-flow and out-flow of fluid (oil) as desired.

The principle of operation of the multiple ram assembly as illustrated in FIGS. 2 to 6 is as follows.

When oil, or indeed any suitable hydraulic fluid, is pumped into an inlet port 17 of the first stage or ram assembly 10, then a force will be applied to connection plate 12 which in turn applies a resultant force to ram assembly 20, which in turn applies such a force to all adjacent ram assemblies. The resultant moment generated by the offset forces acting on the connection plates 12, 22 etc. are balanced or compensated for by the aforementioned wheels or bearings 40 and guide rails 15. At the same time, the inlet oil pressure of the ram assembly 10 is in fact directed to the top of the piston rod thereof and is then fed through to the housing of ram assembly 20, which is in turn connected through to ram assembly 30, and so on. All ram assemblies 10, 20, 30 etc. can thus be seen to be connected hydraulically in parallel. Because the assembly 30 with the lightest load would tend to move first, a mechanical phasing system is used to pull ram-assembly 30 in an upwards direction at something of the order of half the relative speed difference between the car or carriage and the ram assembly 20. Another assembly ensures that the ram assembly 20 moves at something of the order of half the relative speed difference between ram assemblies 30 and 10. The total assembly therefore is mechanically phased with a total stroke which is nominally three times the retracted length of the ram (in the preferred embodiment shown), with no variations in speed. The guide rail assembly 15, apart from acting as or providing a means for controlling the direction of movement, provides the overall structure with resistance to buckling. In an especially preferred embodiment the tube assemblies extending between adjacent ram assemblies 10, 20, 30, etc. may be equipped with air bleed means 18 of any known type, such bleed means 18 being disposed as appropriate.

Figure 7:
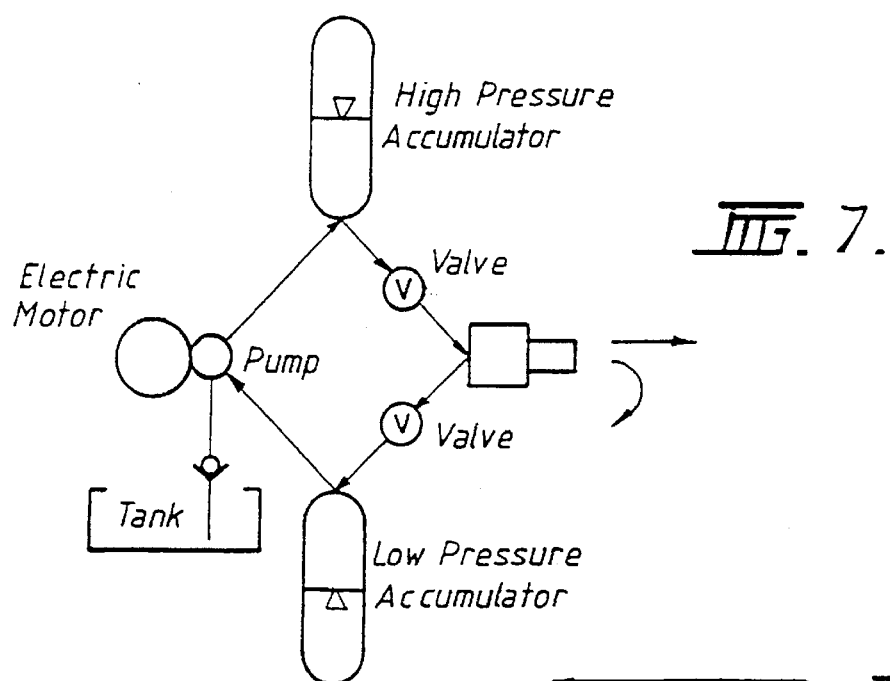
FIGS. 7, 8 and 9 are schematic views of three alternative embodiments of an accumulator drive system in accordance with the present invention.
Figure 8:
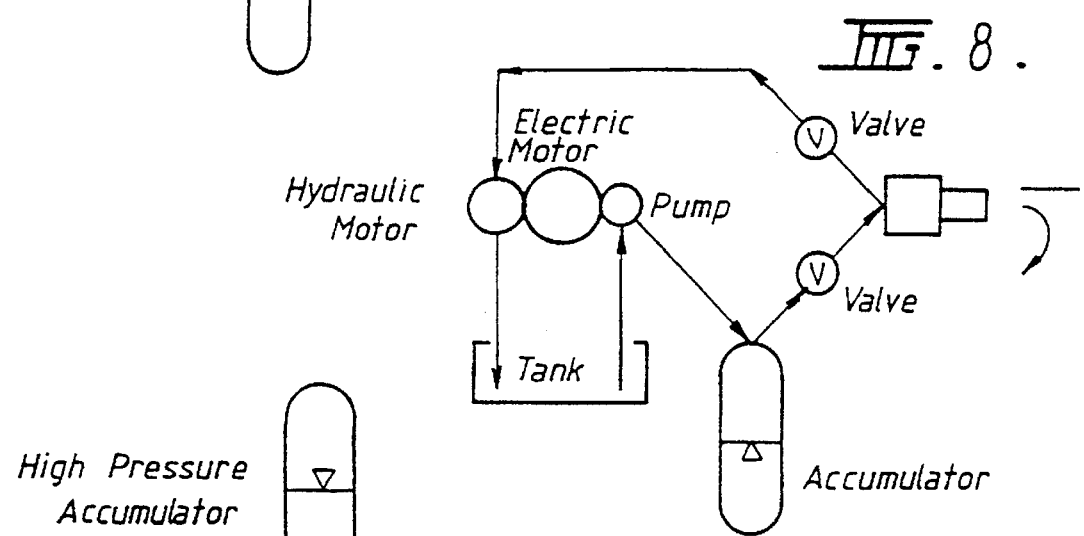
Figure 9:
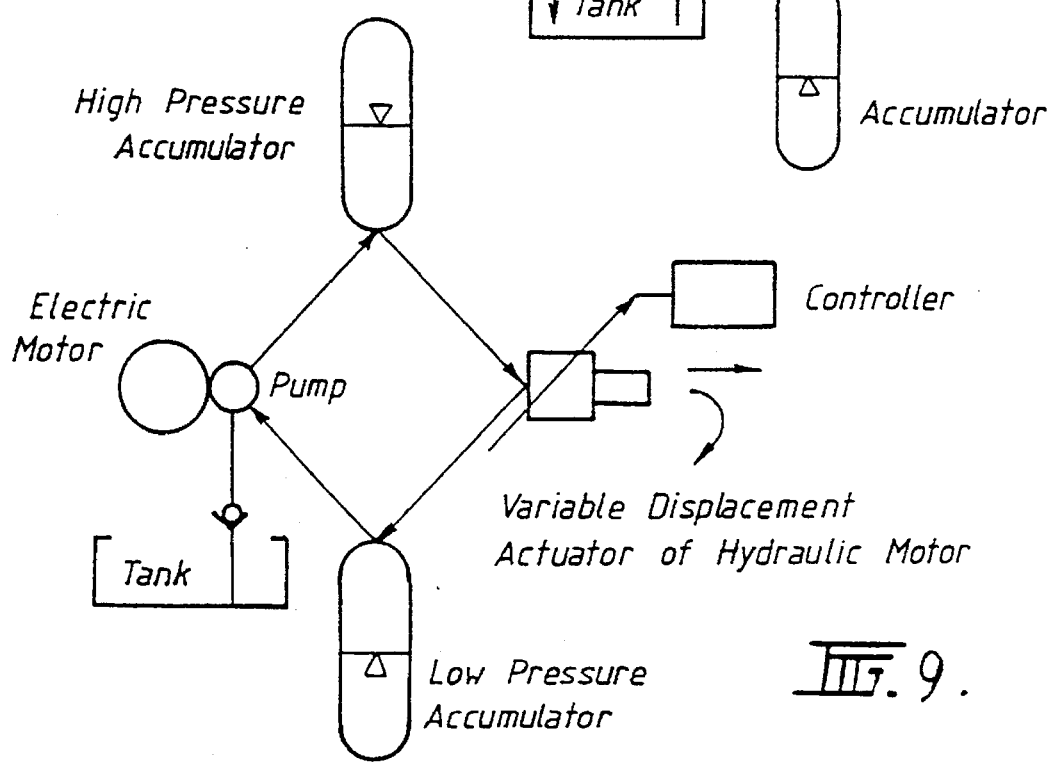

Turning now to FIGS. 7, 8 and 9 of the drawings, there are illustrated therein preferred embodiments of an accumulator drive system for a lift or elevator in accordance with the present invention. In that regard it should be understood that, whilst in the ensuing description, for ease of explanation reference is made in particular to the use or utilisation of such an accumulator drive system with a lift or elevator of the hydraulic ram type, in practical terms an accumulator system in accordance with the present invention is equally suitable for use with all types of currently commercially available lifts or elevators, regardless of the methods or means employed for activation thereof, and in fact with any other drive system which utilises hydraulic fluid under pressure. In other words, and in the field of lifts, the accumulator drive system in accordance with the present invention is equally suitable for use in lieu of hydraulic DC or AC electric traction elevators, or with hydraulic ram or cylinder elevators and/or ball screw type elevators.

In accordance with the known art hydraulic ram or cylinder-type elevators include a ram or cylinder-piston assembly operatively connected to a lift car or carriage which in turn is, or may be, driven by a hydraulic power pack. The car or carriage is driven upwardly, as a result of power or energy input, but as stated earlier a bleeding to atmosphere effect is utilised to achieve or give rise to downward motion. Such arrangements do not employ any counterweight and, in the result, energy is irretrievably or non-recoverably lost on the downward motion step or stage.

The accumulator drive system of the present invention is functional regardless of whether or not the overall lift or elevator is of a traction or ram design. In actual fact the principle of operation will still be the same, as explained hereinafter.

Three-phase or single-phase electrical power is converted into hydraulic energy through an electric motor/hydraulic pump combination of any given type. The hydraulic energy may be stored in a hydraulic accumulator which is then released into a rotary or linear actuator via any given means, such as for example a proportional valve or a variable displacement hydraulic motor. When the energy from the actuator is regenerative, it is distributed via another valve to either a low pressure accumulator or a larger displacement motor, (fixed or variable in volume), and then back to a storage tank or reservoir. In the second of the systems illustrated in FIG. 8, a primary pump is thus actuated, charging the high pressure accumulator but at a reduced volume.

The first system will require the electric motor to be switched on to recharge the high pressure accumulator from the lower pressure accumulator, but the required energy from the electric motor will be less as the pressure compared to atmospheric inlet will be much less. This results in a saving of energy and manufacturing costs. The electric motor is switched on to recharge the accumulator and works independently from the operation of the overall elevator.

Yet another means or mechanism for achieving rotary movement, not illustrated, could be by utilising the torque provided as a result of angular change/displacement of a swash-plate or the like in an axial piston motor or the like equipment. In such an arrangement the angle of inclination of the swash-plate is changeable in order to allow for variation of the actual direction of hydraulic flow. Such a motor incorporates a mechanism which alters torque versus exposed pressure differential and would provide the same result as a fixed torque/differential pressure design with a proportional metering valve, but would exhibit improved or enhanced efficiency. Such a configuration will require some degree of control of the torque altering mechanism in terms of parameters such as acceleration, speed and position, via a suitable electronic or pilot controller—operating preferably in a closed loop configuration.

With such an arrangement the differential pressure between the respective low and high pressure accumulators is a function of the entrapped off volume and also the inert gas precharge levels. In an elevator structure in accordance with the present invention this differential pressure varies at all floor levels and will require constant regulation of the torque altering mechanism in order to achieve the required speed/position performance. An arrangement to bring about such a result is illustrated schematically in FIG. 9.

Figure 10:
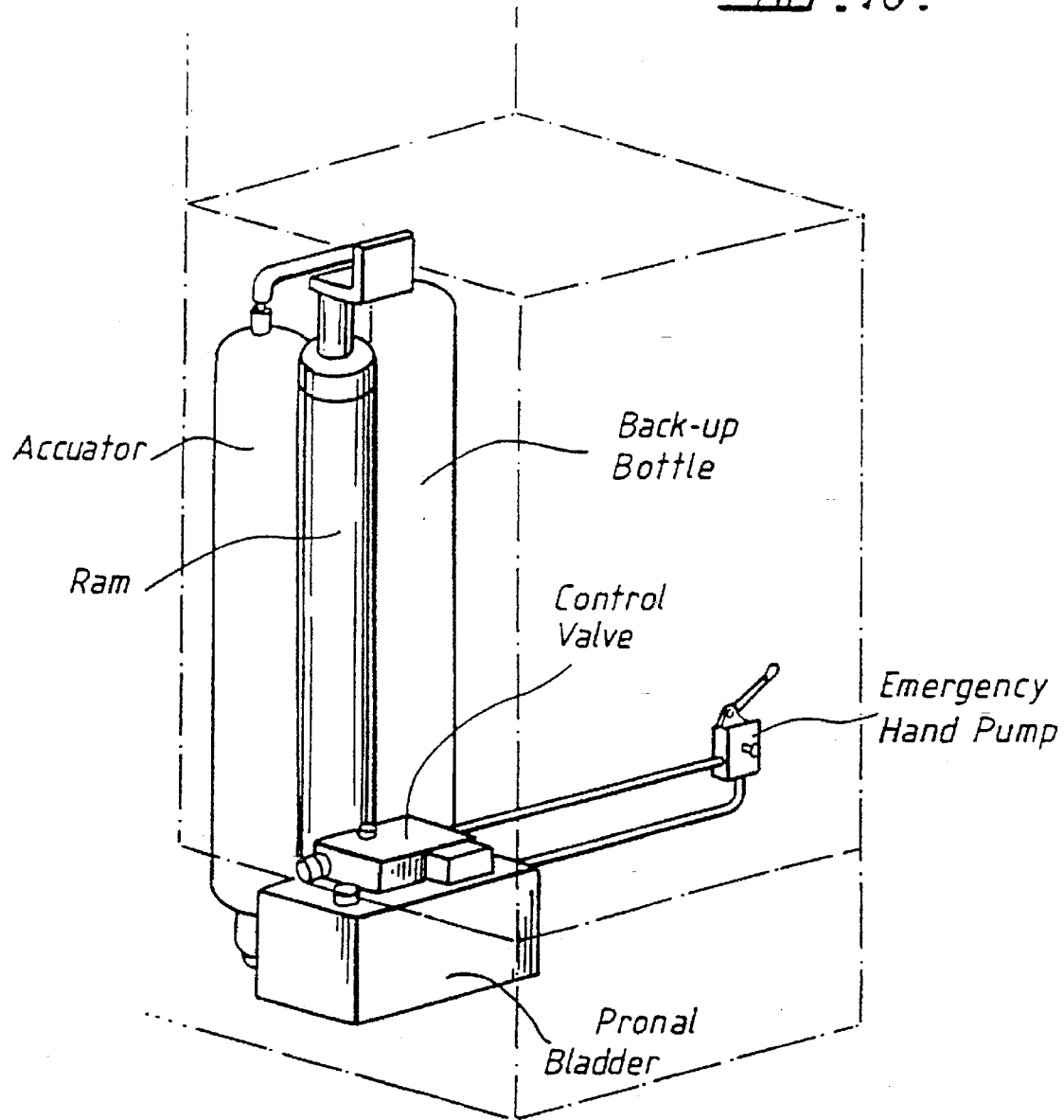

FIG. 10 depicts a preferred embodiment of an accumulator drive system for a hydraulic elevator in accordance with the present invention, being an embodiment wherein the hydraulic system itself is totally enclosed within a pronal bladder, together with a submersed electric motor. With such an embodiment, since most of the hydraulic fluid (oil) is in fact stored in the accumulator or ram, then the size of stored reservoir required is substantially reduced, especially when compared to current, and conventional systems.

Figure 11:
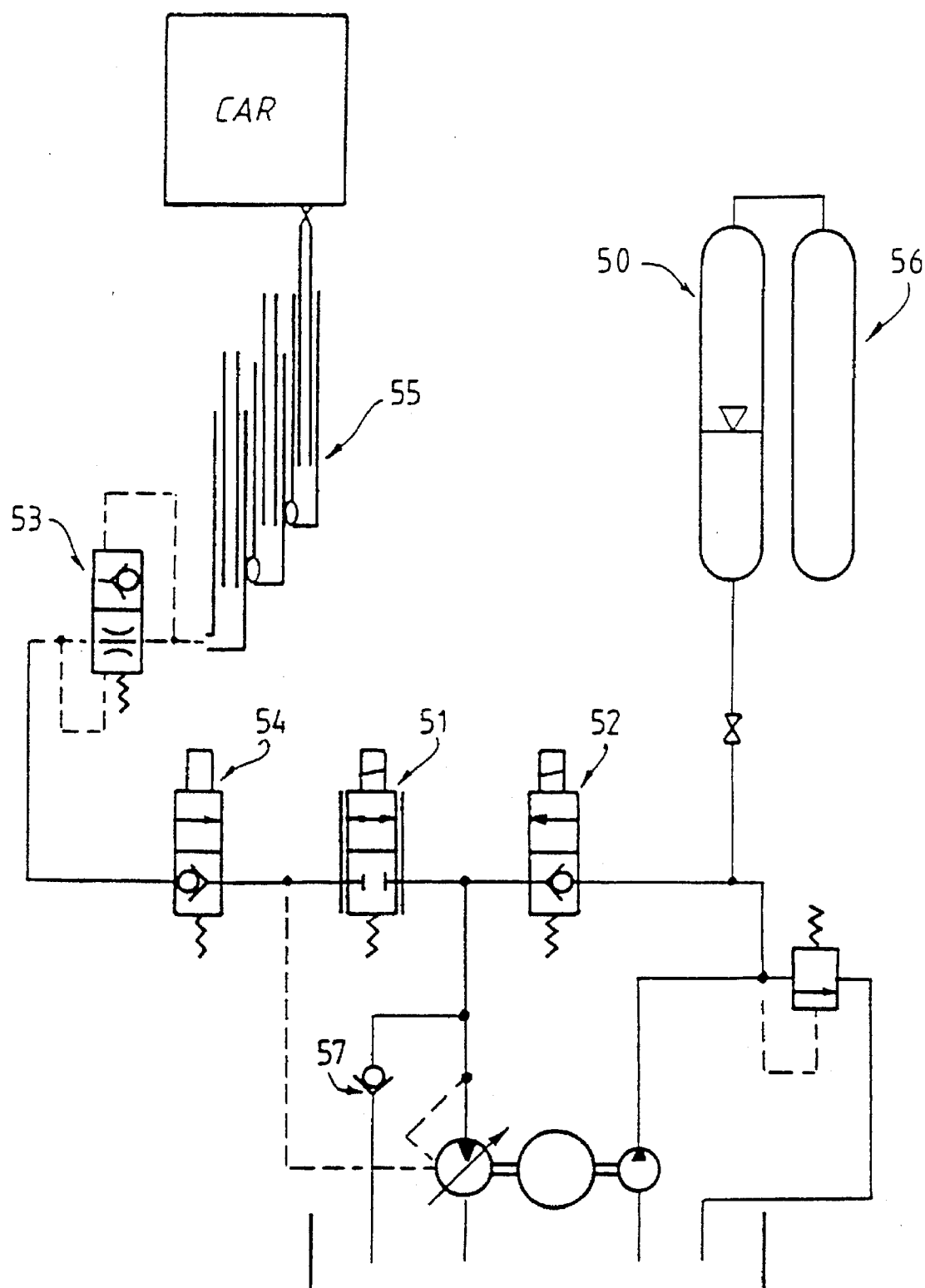
FIG. 11 is a schematic or diagrammatic representation of a preferred embodiment of a lift or elevator inducting an accumulator drive system in accordance with the invention.

With reference now to FIG. 11, in the arrangement depicted therein hydraulic fluid (e.g. oil) is stored in a pressure vessel 50 at a predetermined pressure (e.g. 1000 p.s.i.). When the lift car is "called" from a foyer, for example, or a person enters the car and presses the button for a particular floor or storey, the following sequence of operations occurs.

(1) The proportional valve 51 and accumulator poppet valve 52 are energised and fluid flows, at say 1000 p.s.i., from the pressure vessel 50 through the door lock valve 54 and hose burst valve 53 into cylinder 55. The car will then move in an upward direction.

(2) Nitrogen, or other inert gas, will flow from balancing tank 56 to maintain the pressure within the pressure vessel 50 at 1000 p.s.i., or thereabouts.

(3) The lift car will stop at the preselected floor.

It should be noted that, during this sequence of steps or operations, the motors and pumps do not have to run if the accumulator is charged. When the lift car is required to travel in a downwards direction, the sequence of operations is as follows.

(1) The proportional valve 51 and door lock valve 54 are energised and fluid will flow out of the cylinder 55 and back via a variable displacement motor to recharge the accumulator 50 at a reduced volume. The electric motor may be required to top up the accumulator for lost energy.

(2) The car will then descend and stop at the selected floor.

(3) The electrical motor may be required to be switched on during such descent, or possibly immediately thereafter to top up the high pressure accumulator. The motor and pump system energise and return the fluid from the low pressure accumulator to the high pressure accumulator at, say, 1000 p.s.i.

(4) Nitrogen (or other inert gas) is then displaced as the pressure vessel 50 recharges, and is driven back to the balancing tank 56.

It can therefore be seen that, with such an arrangement, the motors operate only when the pressure vessel needs charging, and not necessarily when the elevator works. This fact alone means that, in a practical sense, the power output needed from such motors is much reduced when compared with conventional elevator systems, since the motor does not have to meet peak conditions. Since a smaller motor is thus required, then overall bulkiness of the system is substantially reduced, as is both installation and manufacture, as well as maintenance and operating costs.

The present applicant's arrangement, in contrast to conventional drive systems for lifts or elevators—which pump oil direct into an elevator cylinder and then dump it to atmospheric pressure on the downstroke—captures the oil or fluid under pressure on the downstroke and recycles the energy stored or retained thereby. The present applicant's arrangement stores exhaust oil in an accumulator pressure vessel at a pressure just a little less than the original working or operating pressure. A small capacity (and size) pump then operates to restore such fluid to working pressure and stores it in a high pressure accumulator, ready for use on the next ride or operation of the elevator.

The arrangement in accordance with the present invention is responsible for a number of advantages when compared with the known prior art. These advantages may be summarised as follows:

(1) economical to construct, with it being estimated that the cost involved will be no more than 25% of phasing telescopic design and no more than 50% of mechanical phasing design configurations, dependent upon the stroke load and actual production methods;

(2) the present applicant's arrangements require very simple machinery to manufacture, this in contrast to the known art;

(3) the spatial arrangement in accordance with the present invention lends itself to modular assembly on site, with there being in effect no need for cranes or other heavy lifting equipment;

(4) the arrangements in accordance with the present invention are remarkably simple to maintain when compared with the known art, with a low inventory of spare parts being necessary;

(5) by virtue of the reduced sealing area required, and also by virtue of the fact that striction forces of each sealing member are non-additive due to the parallel arrangement, a high performance can be expected, again when compared with the known art;

(6) because the pump operates only when the car is not moving upwardly, this means a smoother and quieter operation—in other words enhanced performance; pump size is no longer a function of the car speed, but rather of the duty cycle; it is envisaged that even a high duty elevator will require an electric motor pump combination which is of a size of the order of 25% that used in current designs;

(7) the present applicant's system will continue to function, even after power failure, until such time as the accumulator pressure vessel has exhausted its pressure advantage; this will mean that, even in the instance of power failure, a lift in accordance with the present invention will still be able to deliver passengers to the next floor, eliminating the possibility of passengers being trapped by a power failure (provided back-up power is available to operate essential circuitry;

(8) in some situations, dependent upon expected load, etc., it may even be possible to use single phase power to operate a lift in accordance with the present invention.

(9) with the present applicant's arrangement, and once again in contrast to the known art, there will be no need for accumulators, silencers, etc. with in effect all low and high frequency noises generally associated with on-line pump systems of hydraulic lifts of the traditional type being eliminated, since with the applicant's arrangement substantial laminar flow is easily achieved and readily maintained;

(10) by virtue of the reduced input power requirements, not only will the overall size of a lift system be significantly reduced, but the actual physical size of ancillary equipment—mains power supply lines, etc.—will also be reduced;

(11) major energy efficiencies of up to 75% over conventional equipment, by using low and high pressure accumulator pressure vessels;

(12) large reduction in motor, pump and component sizes—the pump and motor will utilise the time when the lift is stationary or moving down to charge the high pressure accumulator, and use of higher operating pressures (up to 120 bars) will also assist in reducing component and hose sizes;

(13) reduced oil requirements, since this is a sealed system with little waste heat, and oil requirements will be a fraction of convention systems which dump the oil to atmosphere in a large tank;

(14) down stream savings, since the pump and motor are approximately one quarter the size of conventional equipment, and in-coming electrical mains and the overall power allocation to the elevator will be greatly reduced;

(15) waste heat generated by dumping off under pressure back to atmosphere will be virtually eliminated, greatly reducing the need to mechanically ventilate the elevator motor room;

(16) ability to use the elevator in a power failure, since using battery back up, the system will continue to operate (up or down) whilst the high pressure accumulator is charged, systems which can only operate in the down direction;

(17) reduced flow rates for the same elevator performance—this design can run at 1 m/sec at a flow rate of 200 liters/min, which is approximately half the flow required of conventional telescopic designs because the design is based upon the strength of the most slender member, yet their flow pressure are determined by the size of the lower (largest) member across its cross sectional area; and

(18) keeps hydraulic line sizes and control valve sizes to 20 mm (¾") for virtually all load/speed combinations—offering large savings over larger, conventional designs.

In closing, it should be realised that the aforegoing description refers merely to preferred embodiments of the present invention, and that variations and modifications will be possible thereto without departing from the spirit and scope of the invention, the ambit of which is to be determined from the following claims.

We claim:

1. A multi-stage hydraulic ram assembly comprising a plurality of piston-cylinder arrangements connected hydraulically in parallel and mechanically in series, wherein each of the piston-cylinder arrangements includes a piston, and a cylinder having a base, and wherein the piston-cylinder arrangements are disposed in substantial side-by-side relationship, constituting adjacent or successive stages of said ram assembly; means for controlling the direction and speed of movement of adjacent stages of said assembly; means for ensuring that all of the stages of said assembly move at substantially the same speed; means associated with the base of the cylinder of each of said piston-cylinder arrangements for ensuring and for maintaining interconnection in use between adjacent cylinders, including a bracket fixedly attached to one cylinder and slidably connected to the adjacent cylinder; and a drive system for operating said ram assembly.

2. The assembly as claimed in claim 1, wherein all pistons and cylinders in said assembly exhibit substantially the same cross-sectional area.

3. The assembly as claimed in claim 2, further including hydraulic cushioning means associated with each piston-cylinder arrangement and adapted, in use, to ensure substantially uninterrupted transmission of hydraulic fluid and generated force between the piston-cylinder arrangements, thereby ensuring smooth, uninterrupted operation of said assembly.

4. The assembly as claimed in claim 3, wherein said means for controlling the direction of movement of adjacent stages of said assembly includes an elongate guide rail extending in the direction of movement of said piston-cylinder arrangements, for slidably engaging the stages of said assembly.

5. The assembly as claimed in claim 4, wherein each cylinder includes an outer housing and an inner rod movable relative to the outer housing, wherein each cylinder includes, in the vicinity of the base, an internal rolling means associated with said inner rod for controlling and guiding movement of said inner rod under pressure relative to said outer housing.

6. The assembly as claimed in claim 5, further including means for guiding upward movement of adjacent cylinders relative to one another, including rolling means adapted, in use, to travel upwardly or downwardly in substantially continuous contact with the outer housing of an adjacent cylinder.

7. The assembly as claimed in claim 6, wherein said drive system is an hydraulic system which includes respective high and low pressure accumulator means and pump means for directing hydraulic fluid therebetween.

8. An accumulator drive system for use in moving elevators between storeys of a multi-storey structure, said system comprising: a source of power; high pressure accumulator means; low pressure accumulator means; pump means for directing hydraulic fluid between said high pressure means and said low pressure means; a reservoir for said hydraulic fluid; and control means for controlling the speed and direction of flow of said fluid, wherein said drive system is in powered connection with a multi-stage hydraulic ram assembly including a plurality of piston-cylinder arrangements connected hydraulically in parallel and mechanically in series, wherein each of the piston-cylinder arrangements includes a piston, and a cylinder having a base, and wherein the piston-cylinder arrangements are disposed in substantial side-by-side relationship, constituting adjacent or successive stages of said ram assembly; means for controlling the direction and speed of movement of adjacent stages of said assembly; means for ensuring that all of the stages of said assembly move at substantially the same speed; means associated with the base of the cylinder of each of said piston-cylinder arrangements for ensuring and for maintaining interconnection in use between adjacent cylinders, including a bracket fixedly attached to one cylinder and slidably connected to the adjacent cylinder; and a drive system for operating said ram assembly, thereby imparting controlled movement in both speed and direction to said moving elevators.

9. The accumulator drive system as claimed in claim 8, wherein said control means includes valve means for controlling the direction and volume of flow of said fluid.

10. The accumulator drive system as claimed in claim 9, wherein said valve means are proportional valves.

11. The accumulator drive system as claimed in claim 10, further including rotary or linear actuator means for receiving stored hydraulic energy and releasing said energy for effecting movement of a lift car.

12. The accumulator drive system as claimed in claim 11, including a variable displacement hydraulic motor for directing said stored hydraulic energy to said rotary or linear actuator means.

13. An elevator assembly adapted to transport a load between storeys of a multi-storey structure, said assembly including: means for receiving and carrying said load; means for imparting movement to said carrying means; and means for controlling the direction and speed of movement of said carrying means; wherein said means for imparting movement to said carrying means includes a multi-stage hydraulic ram assembly adapted, in use, to extend between said storeys of said structure, said ram assembly including a plurality of piston-cylinder arrangements connected hydraulically in parallel and mechanically in series, wherein each of the piston-cylinder arrangements includes a piston, and a cylinder having a base, and wherein the piston-cylinder arrangements are disposed in a substantial side-by-side relationship, constituting adjacent or successive stages of ram assembly; means for controlling the direction and speed movement of adjacent stages of said assembly; means for ensuring that all of the stages of said assembly move at substantially the same speed; means associated with the base of the cylinder of each of said piston-cylinder arrangements for ensuring and for maintaining interconnection in use between adjacent cylinders, including a bracket fixedly attached to one cylinder and slidably connected to the adjacent cylinder; and a drive system for operating said ram assembly, thereby imparting controlled movement in both speed and direction to said means for receiving and carrying said load.

* * * * *